No. 707,166. Patented Aug. 19, 1902.
R. M. SEBREE.
HORSE PROTECTOR.
(Application filed Sept. 20, 1901.)
(No Model.)

Witnesses:
R. M. Combs
M. L. Lauge

Inventor,
R. M. Sebree.
By Higdon & Higdon
Att'ys.

UNITED STATES PATENT OFFICE.

ROBERT M. SEBREE, OF KANSAS CITY, KANSAS.

HORSE-PROTECTOR.

SPECIFICATION forming part of Letters Patent No. 707,166, dated August 19, 1902.

Application filed September 20, 1901. Serial No. 75,974. (No model.)

*To all whom it may concern:*

Be it known that I, ROBERT M. SEBREE, a citizen of the United States, and a resident of Kansas City, in the county of Wyandotte and State of Kansas, have invented new and useful Improvements in Horse-Protectors, of which the following is a specification.

My invention relates to attachments for protecting horses from the heat of the sun, from the cold in winter, and from snow and rain storms.

My invention is constructed and attached to the ordinary harness in the manner described hereinafter with reference to the accompanying drawings, in which—

Figure 1:
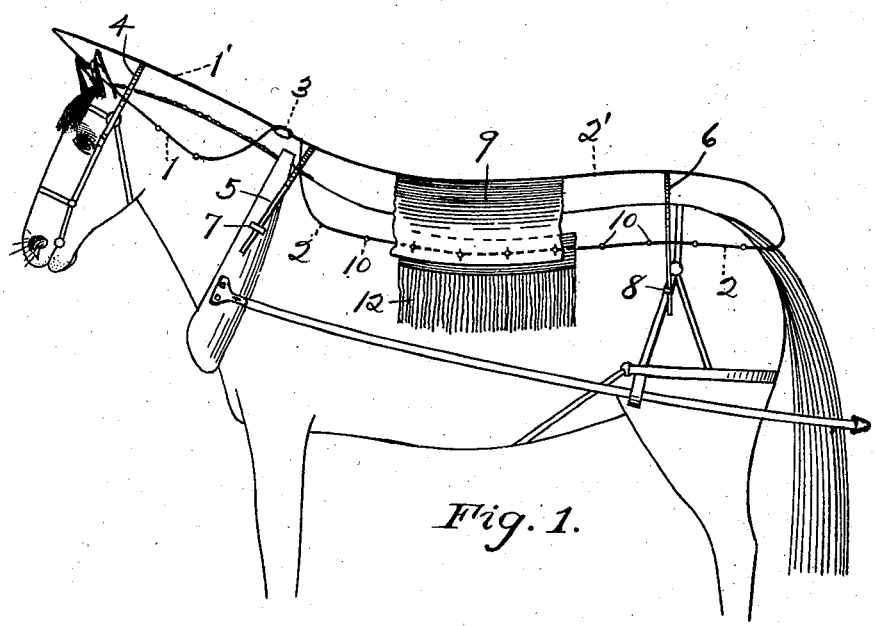
Figure 3:
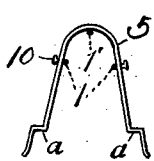
Figure 4:
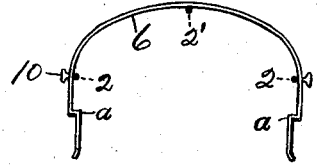
Figure 5:
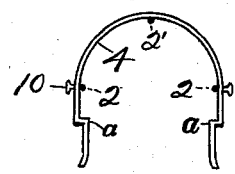
Figure 2:
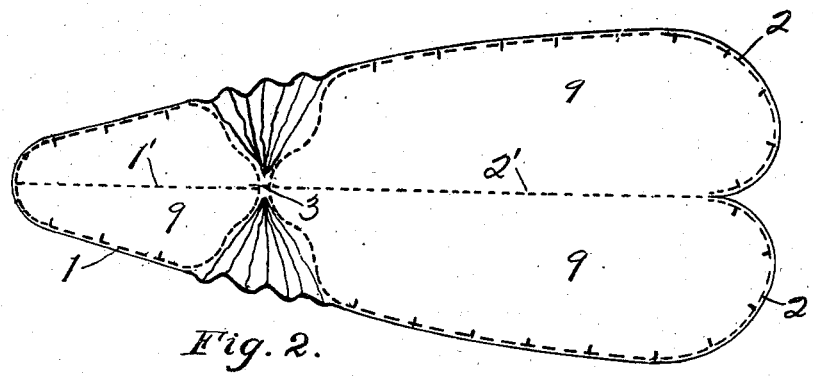
Figure 6:

Figure 1 represents the frame of the protecting-cover attached to the harness, the cover itself being broken away except at the middle of the back, showing also a portion of a fly-net attached to the frame. Fig. 2 is a top plan view of the cover, the frame being indicated by dotted lines. Figs. 3, 4, and 5 are detached views of the three frame-supporting ribs, respectively. Fig. 6 is a detached view of a double snap-hook adapted to pivotally connect the back and neck frames together, as indicated at 3, Fig. 3, and at 3, Fig. 2, in dotted lines, also showing the frames in cross-section in position in the hooks.

Two separate frames 1 and 2 are provided, one for the head and neck, the other for the back. These frames are made of stiff wire bent in the required shape. They are connected pivotally over the neck by a snap, ring, or link 3 to permit the usual movements of the animal's head. Extending longitudinally and centrally of the frames 1 2 are supporting-ribs 1' and 2'.

The head-frame 1 is supported by and secured to a bow 4, the ends of which are inserted in leather loops provided on the bridle for this purpose. The back or main frame 2 is supported by two bows 5 and 6. The ends of the forward bow 5 are inserted in staples 7, attached to the hames or collar. The ends of the rear bow 6 are inserted in loops or staples 8 on the tug-supporting straps. All of these bows are recessed at their ends $a\,a$, as shown, in order to support the frames 1 2 above the animal. The shape of the bows 4, 5, and 6 (shown in Figs. 3, 4, and 5) holds the frames 1 2 in such a position that the cover 9 is supported about three inches from the horse's body all around, which will permit circulation of air between the animal and the cover. The cover 9 is attached to the frames 1 and 2 by buttons 10 on the frames engaging buttonholes in the cover.

When it is desired to use a fly-net, a special fly-net 12, such as shown in part in Fig. 1, is employed, having a strip of cloth at its upper edge provided with buttonholes for attachment to the buttons on the frame 2.

In Fig. 1 the cover 9 is cut away to expose the frames 1 and 2.

Having now fully described my invention, what I claim as new, and desire to secure by Letters Patent of the United States, is—

In a horse-protector, the combination of a body-frame and a head-frame, the head-frame being pivotally connected to the body-frame and adapted to swing laterally with the movement of the horse's head, supporting-bows having their depending ends offset to engage staples on a harness, said body-frame comprising the longitudinal central supporting-rib 2' and the longitudinal side supporting-ribs connected at the front and rear to the central rib, the head-frame comprising the central supporting-rib 1' and the side supporting-ribs connected therewith, and a covering carried by the bows and ribs of the two frames said covering having an adjustable portion at the point where the two frames are pivotally connected.

In testimony whereof I affix my signature in the presence of two witnesses.

ROBERT M. SEBREE.

Witnesses:
M. L. LANGE,
K. M. IMBODEN.